(12) United States Patent
Beaumont et al.

(10) Patent No.: US 11,812,895 B2
(45) Date of Patent: Nov. 14, 2023

(54) GREASE CONTAINMENT SYSTEMS

(71) Applicant: THE GREASE BOX LLC, Phoenix, AZ (US)

(72) Inventors: Amy Beaumont, Scottsdale, AZ (US); Markus Dale Hillman, Mesa, AZ (US)

(73) Assignee: The Grease Box LLC, Phoenix, AZ (US)

( * ) Notice: Subject to any disclaimer, the term of this patent is extended or adjusted under 35 U.S.C. 154(b) by 369 days.

(21) Appl. No.: 16/984,646

(22) Filed: Aug. 4, 2020

(65) Prior Publication Data

US 2022/0039597 A1 Feb. 10, 2022

(51) Int. Cl.
*A47J 37/07* (2006.01)

(52) U.S. Cl.
CPC ................. *A47J 37/0786* (2013.01)

(58) Field of Classification Search
CPC .................................................. A47J 37/0786
See application file for complete search history.

(56) References Cited

U.S. PATENT DOCUMENTS

| | | | |
|---|---|---|---|
| 4,434,781 A * | 3/1984 | Koziol | A47J 37/0713 236/1 G |
| 4,909,137 A * | 3/1990 | Brugnoli | A47J 37/0682 126/41 R |
| 5,582,094 A * | 12/1996 | Peterson | A47J 37/0786 99/425 |
| 6,182,560 B1 * | 2/2001 | Andress | A47J 37/0718 99/449 |
| 6,237,472 B1 | 5/2001 | Gates | |
| 6,247,468 B1 | 6/2001 | Wood | |
| 6,463,924 B1 | 10/2002 | Osterman | |
| 8,016,150 B1 * | 9/2011 | Bunch | A47J 37/1271 220/571 |
| 2008/0271613 A1 * | 11/2008 | Lee | A47J 37/0786 99/446 |
| 2013/0313256 A1 * | 11/2013 | Brown | B65F 1/16 220/254.3 |
| 2014/0311356 A1 | 10/2014 | Daniels | |
| 2017/0020336 A1 * | 1/2017 | Cole | A47J 37/0704 |
| 2017/0119209 A1 * | 5/2017 | Jenks | A47J 37/041 |
| 2018/0168395 A1 | 6/2018 | Colston | |

(Continued)

FOREIGN PATENT DOCUMENTS

CN 202960181 U 6/2013
CN 106913230 A 7/2017

(Continued)

*Primary Examiner* — Nathaniel E Wiehe
*Assistant Examiner* — Keith Brian Assante
(74) *Attorney, Agent, or Firm* — Michelle L. Gross, P.C.

(57) ABSTRACT

A safety system relating to outdoor cooking devices, such as wood pellet grills. An enclosure around a grease drain bucket. The enclosure designed to create a thermal buffer around the grease drain bucket and to securely mount to a drain of the outdoor cooking device increasing stability. The enclosure providing both burn safety and spill prevention, while still allowing ventilation of the heat from the grease collected. Adjustable vents in the walls of the enclosure allowing optional dampening of ventilation and suppression of fire potential inside the enclosure. Increasing safety of the outdoor cooking devices through cleanliness, stability and control of oxygen and flow of heat in the fire prevention triangle.

16 Claims, 7 Drawing Sheets

(56) References Cited

U.S. PATENT DOCUMENTS

| | | | |
|---|---|---|---|
| 2018/0228317 | A1 | 8/2018 | Buzick et al. |
| 2018/0296031 | A1* | 10/2018 | Terrell, Jr. .......... A47J 37/0786 |
| 2018/0338641 | A1 | 11/2018 | Yaghotian et al. |
| 2019/0365151 | A1 | 12/2019 | Dahle et al. |

FOREIGN PATENT DOCUMENTS

| | | | | |
|---|---|---|---|---|
| CN | 108478035 | A | | 9/2018 |
| CN | 210493798 | U | | 5/2020 |
| GB | 2086713 | | * | 11/1981 |
| GB | 2086713 | A | * | 5/1982 .............. A47J 37/10 |
| KR | 20140000548 | U | | 1/2014 |
| KR | 101803028 | B1 | | 11/2017 |

\* cited by examiner

GREASE CONTAINMENT SYSTEMS

BACKGROUND

This invention relates to providing a system for improved grease containment systems. More particularly this invention relates to providing a system for increased safety in grease containment in outdoor cooking devices, such as smokers, grills, etc. Outdoor cooking devices collect juices from the food as it is being cooked and then drain the juices into a bucket through a drain.

The bucket is open at the top and can easily be spilled if bumped by people, objects (like toys, balls, etc.) or a stream of water from a garden hose. Additionally, with an open top, water from rain, sprinklers, and garden hoses can mix with the grease and overflow or tip the bucket spilling the fluids, which are mostly grease. When the grease is spilled, it creates a mess. The grease may coat a surface in such a way as to create a slipping hazard and is difficult to clean up. Further, the grease attracts insects and other animals and over time can lead to undesirable smells in the area around the outdoor cooking device.

Likewise, the bucket and its contents, which are often hot, can be directly touched by people around the cooking device. Burns, particularly for children and pets, can be severe and are highly undesirable. Additionally, when the outdoor cooking device is used at higher temperatures, there is a risk of hot air exiting the drain and catching the grease on fire in the bucket.

Therefore, a need exists for creating a safer system to collect fluids from an outdoor cooking device for disposal. Further, a need exists to increase stability to prevent spilling of the fluids. Additionally a need exists to prevent burns from accidental contact with the containment system. Even further, a need exists to minimize the risk of fires.

OBJECTS AND FEATURES OF THE INVENTION

A primary object and feature of the present invention is to provide a system overcoming the above-mentioned problem.

It is a further object and feature of the present invention to provide such a system which encloses a fluid collection bucket. Another primary object and feature of the present invention is to provide a system having insulation between the fluid collection bucket and an enclosure surrounding it.

An even further object and feature of the present invention is to provide a system which contains spills from the fluid collection bucket.

Another object and feature of the present invention is to provide a system which increases stability of the fluid collection bucket It is another object and feature of the present invention to provide a system which ventilates heat from collected fluids to an outdoor environment to allow cooling of the collected fluids.

Yet another object and feature of the present invention is to provide a system which can mount to the outdoor cooking device accepting a drain built into the outdoor cooking device, whether the drain comes from the side or the bottom of the outdoor cooking device.

A further object and feature of the present invention is to provide a system having separable pieces to allow cleaning and removal of the collected fluids.

It is a further primary object and feature of the present invention to provide a system which suspends the bucket within an enclosure preventing conduction of heat to the outer surfaces of the enclosure.

Another primary object and feature of the present invention is to provide a system which reduces chances of fire.

A further object and feature of the present invention is to provide a system with a damper system on the vents to control oxygen and therefore fire potential inside the enclosure.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a system, relating to catching fluid drainage from an outdoor cooking device in an outdoor environment, comprising: at least one receptacle structured and arranged to receive and collect fluid draining from the outdoor cooking device generated by food cooking within a cooking enclosure of the outdoor cooking device; an enclosure structured and arranged to enclose such at least one receptacle; wherein such enclosure comprises at least one receptacle support structured and arranged to support such at least one receptacle, at least one mount structured and arranged to mount such enclosure on the outdoor cooking device, walls surrounding such at least one receptacle, a top and a bottom; wherein such enclosure comprises at least one insulation layer between such receptacle and such walls; wherein such enclosure is directly exposed to the outdoor environment while mounted on the outdoor cooking device.

Moreover, it provides such a system further comprising the outdoor cooking device. Additionally, it provides such a system wherein such outdoor cooking device comprises a wood pellet grill. Also, it provides such a system wherein such outdoor cooking device comprises a fluid drainage outlet in a side of such outdoor cooking device. In addition, it provides such a system wherein such outdoor cooking device comprises a fluid drainage outlet in a bottom of such outdoor cooking device. And, it provides such a system wherein such enclosure further comprises an upper portion and a lower portion; wherein such upper portion comprises such top, such lower portion comprises such bottom and both such upper portion and such lower portion comprise such walls.

Further, it provides such a system wherein at least one wall of such walls comprises at least one thermal vent structured and arranged to vent heat from the fluid collected in such at least one receptacle out of such enclosure. Even further, it provides such a system wherein such lower portion separates from such upper portion. Additionally, it provides such a system wherein such lower portion and such upper portion comprise interlocking rails structured and arranged to enable such lower portion to slide with respect to such upper portion. Even further, it provides such a system wherein such lower portion comprises at least one latching mechanism structured and arranged to latch together such upper portion and such lower portion and stopping relative motion between such upper portion and such lower portion.

Even further, it provides such a system wherein such upper portion comprises at least one fluid channel structured and arranged to redirect the fluid drainage from a fluid drainage outlet of the outdoor cooking equipment to such at least one receptacle. Moreover, it provides such a system wherein such upper portion comprises such at least one mount. Even further, it provides such a system wherein such lower portion comprises such at least one insulation layer. Even further, it provides such a system wherein such lower portion comprises such at least one receptacle support. Even further, it provides such a system wherein such lower portion comprises at least one handle.

Even further, it provides such a system wherein such lower portion comprises a watertight portion structured and arranged to collect fluid spills from such at least one receptacle. Additionally, it provides such a system wherein at least one wall of such walls comprises at least one thermal vent structured and arranged to vent heat from the fluid collected in such at least one receptacle out of such enclosure. Moreover, it provides such a system wherein such at least one thermal vent comprises at least one damper structured and arranged to dampen air flow through said enclosure. Even further, it provides such a system wherein such enclosure comprises a watertight portion structured and arranged to collect fluid spills from such at least one receptacle.

Additionally, it provides such a system wherein such at least one insulation layer comprises at least one air gap between such at least one receptacle and such walls. Even further, it provides such a system further comprising at least one fluid channel structured and arranged to redirect the fluid drainage from a fluid drainage outlet of the outdoor cooking equipment to such at least one receptacle. Moreover, it provides such a system wherein such at least one receptacle support comprises at least one wall protrusion structured and arranged to protrude from at least one wall of such walls and engage such at least one receptacle. Even further, it provides such a system wherein such top further comprises at least one notch.

In accordance with another preferred embodiment hereof, this invention provides a system, relating to catching fluid drainage from an outdoor cooking device in an outdoor environment, comprising: the outdoor cooking device; at least one receptacle structured and arranged to receive and collect fluid draining from such outdoor cooking device generated by food cooking within a cooking enclosure of such outdoor cooking device; an enclosure structured and arranged to enclose such at least one receptacle; wherein such enclosure comprises at least one receptacle support structured and arranged to support such at least one receptacle, at least one mount structured and arranged to mount such enclosure on such outdoor cooking device, walls surrounding such at least one receptacle, a top and a bottom; wherein such enclosure comprises at least one insulation layer between such receptacle and such walls; wherein at least one wall of such walls comprises at least one thermal vent structured and arranged to vent heat from the fluid collected in such at least one receptacle out of such enclosure; wherein such at least one thermal vent comprises at least one damper structured and arranged to dampen air flow through said enclosure; and wherein such enclosure is directly exposed to the outdoor environment while mounted on such outdoor cooking device.

Additionally, it provides such a system wherein such outdoor cooking device comprises a wood pellet grill. Even further, it provides such a system wherein such enclosure further comprises an upper portion and a lower portion; wherein such upper portion comprises such top, such lower portion comprises such bottom and both such upper portion and such lower portion comprise such walls. Even further, it provides such a system wherein at least one wall of such walls comprises at least one thermal vent structured and arranged to vent heat from the fluid collected in such at least one receptacle out of such enclosure. Even further, it provides such a system wherein such lower portion separates from such upper portion.

Even further, it provides such a system wherein such lower portion and such upper portion comprise interlocking rails structured and arranged to enable such lower portion to slide with respect to such upper portion. Even further, it provides such a system wherein such lower portion comprises at least one latching mechanism structured and arranged to latch together such upper portion and such lower portion and stopping relative motion between such upper portion and such lower portion. Moreover, it provides such a system wherein such upper portion comprises at least one fluid channel structured and arranged to redirect the fluid drainage from a fluid drainage outlet of the outdoor cooking equipment to such at least one receptacle.

In accordance with another preferred embodiment hereof, this invention provides for each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
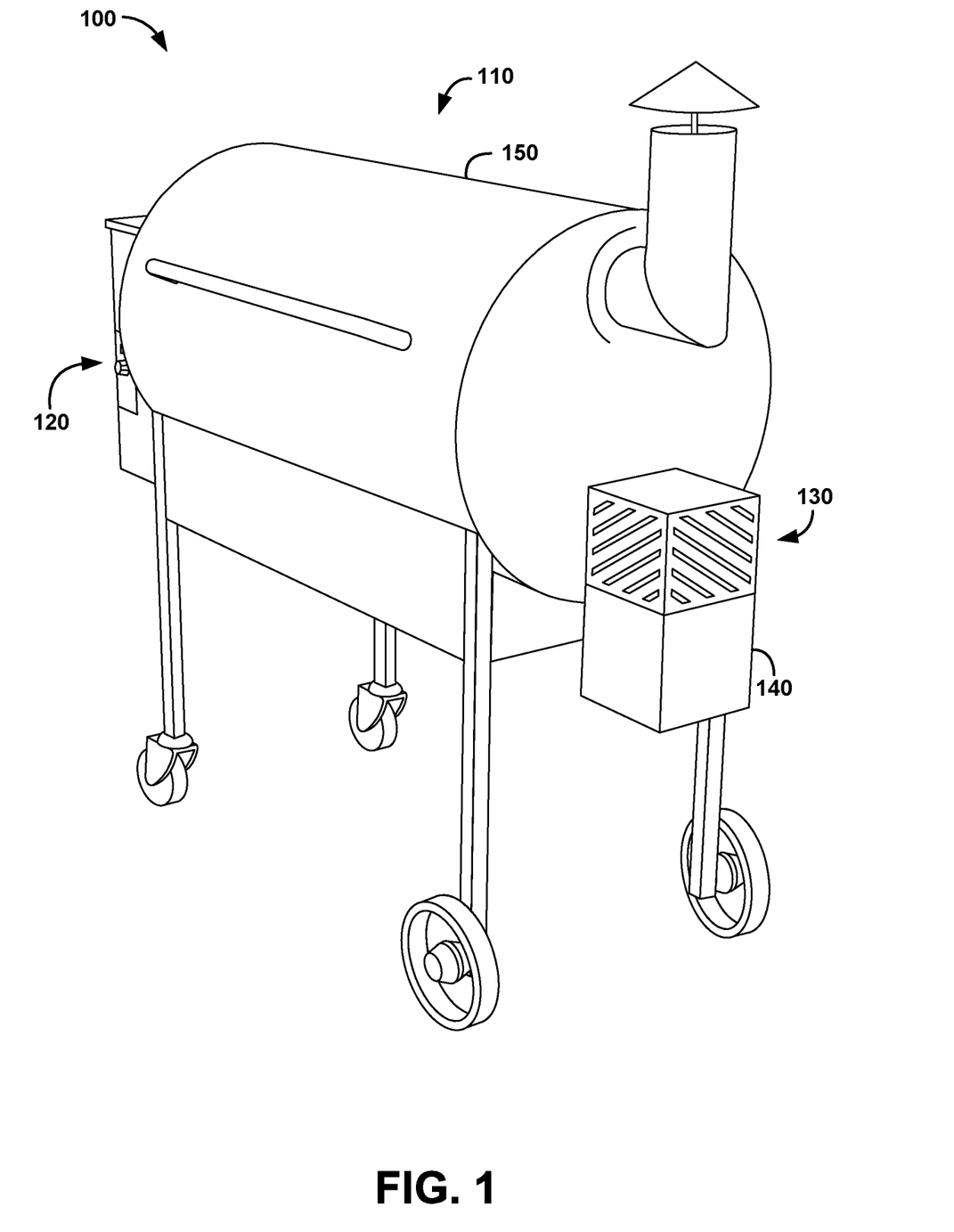
FIG. 1 shows a perspective view illustrating a fluid containment system according to a preferred embodiment of the present invention.

FIG. 1 shows a perspective view illustrating a fluid containment system 100 according to a preferred embodiment of the present invention.

Fluid containment system 100 comprises an outdoor cooking device 110 and enclosure 140, as shown. Outdoor cooking device 110 preferably comprises a device to cook food, preferably a grill, preferably a wood pellet grill, as shown. Upon reading the teachings of this specification, those with ordinary skill in the art will now appreciate that, under appropriate circumstances, considering such issues as future technologies, cooking methods, etc., other outdoor cooking devices, such as, for example, grills, sun ovens, dehydrators, curing ovens, stoves, etc., may suffice.

Outdoor cooking device 110 preferably comprises a cooking enclosure 150, cooking controls 120 and at least one drain 130, as shown. In use, outdoor cooking device 110 cooks food located within cooking enclosure 150. Controls 120 set levels of cooking and control the cooking environment within the cooking enclosure 150. As the food cooks, liquids drip from the food and collect in or near the bottom of cooking enclosure 150. In foods containing fats, the liquids primarily comprise grease. The liquids collected drain out of cooking enclosure 150 through drain 130. Drain 130 preferably couples with a bucket, not shown, which catches the liquids coming out drain 130. The bucket can therefore be emptied between uses to dispose of the liquids, such as grease, which do not evaporate into the outdoor environment.

Fluid containment system 100 additionally places enclosure 140 around the bucket, as shown (at least embodying herein an enclosure structured and arranged to enclose said at least one receptacle). Enclosure 140 provides a safety enhancement to the bucket. Enclosure 140 secures the bucket to drain 130, as shown, preventing direct contact with and upsetting the bucket, which can cause spilling of the liquids. Further, enclosure 140 creates a safety buffer, as shown, preventing direct access to hot surfaces of the bucket and the liquids therein, which minimizes chances of burns from accidental contact.

Figure 2:
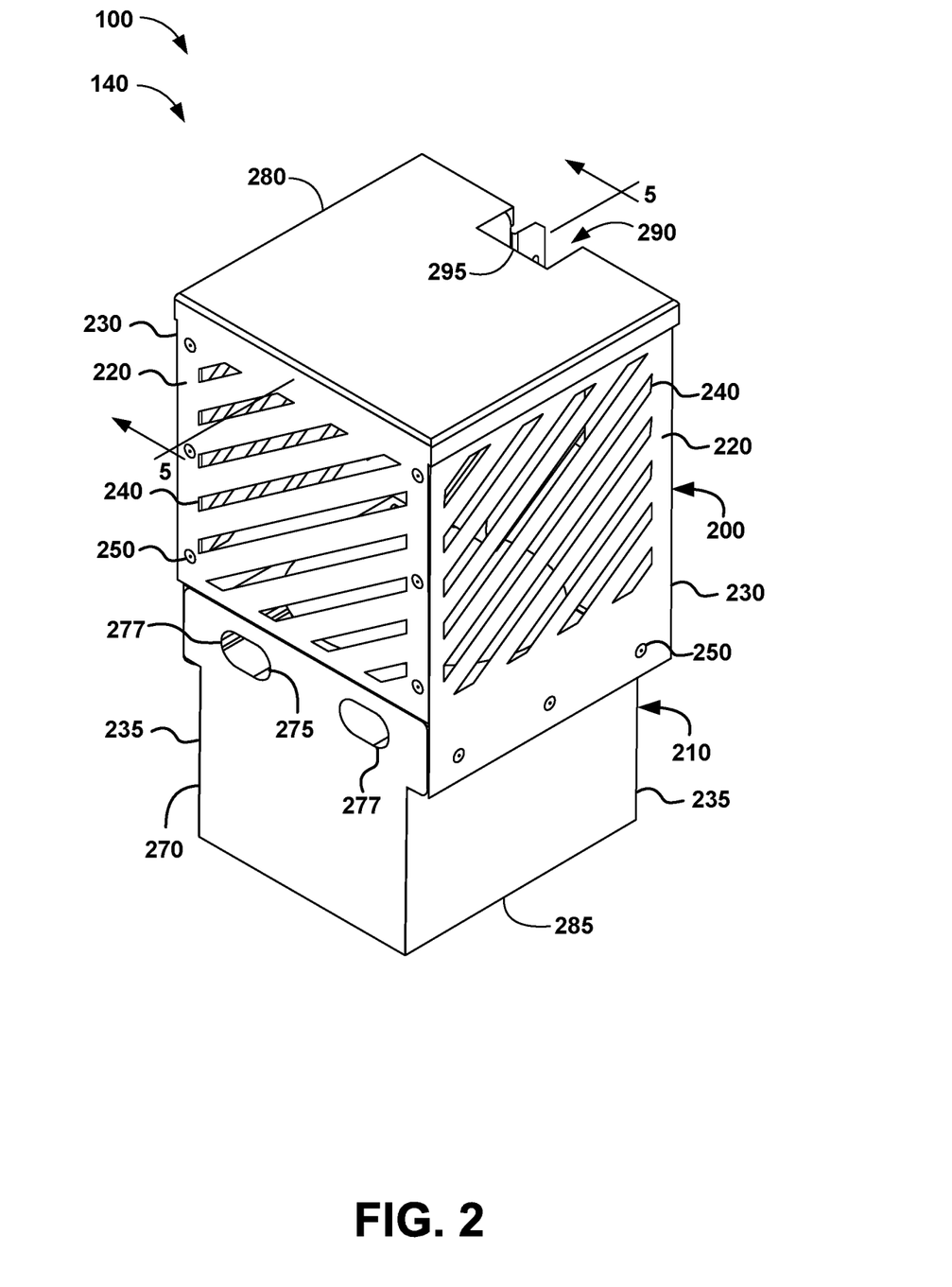
FIG. 2 shows a perspective view, illustrating an enclosure of the fluid containment system, according to the preferred embodiment of FIG. 1.

FIG. 2 shows a perspective view, illustrating enclosure 140 of fluid containment system 100, according to the preferred embodiment of FIG. 1.

Figure 3:
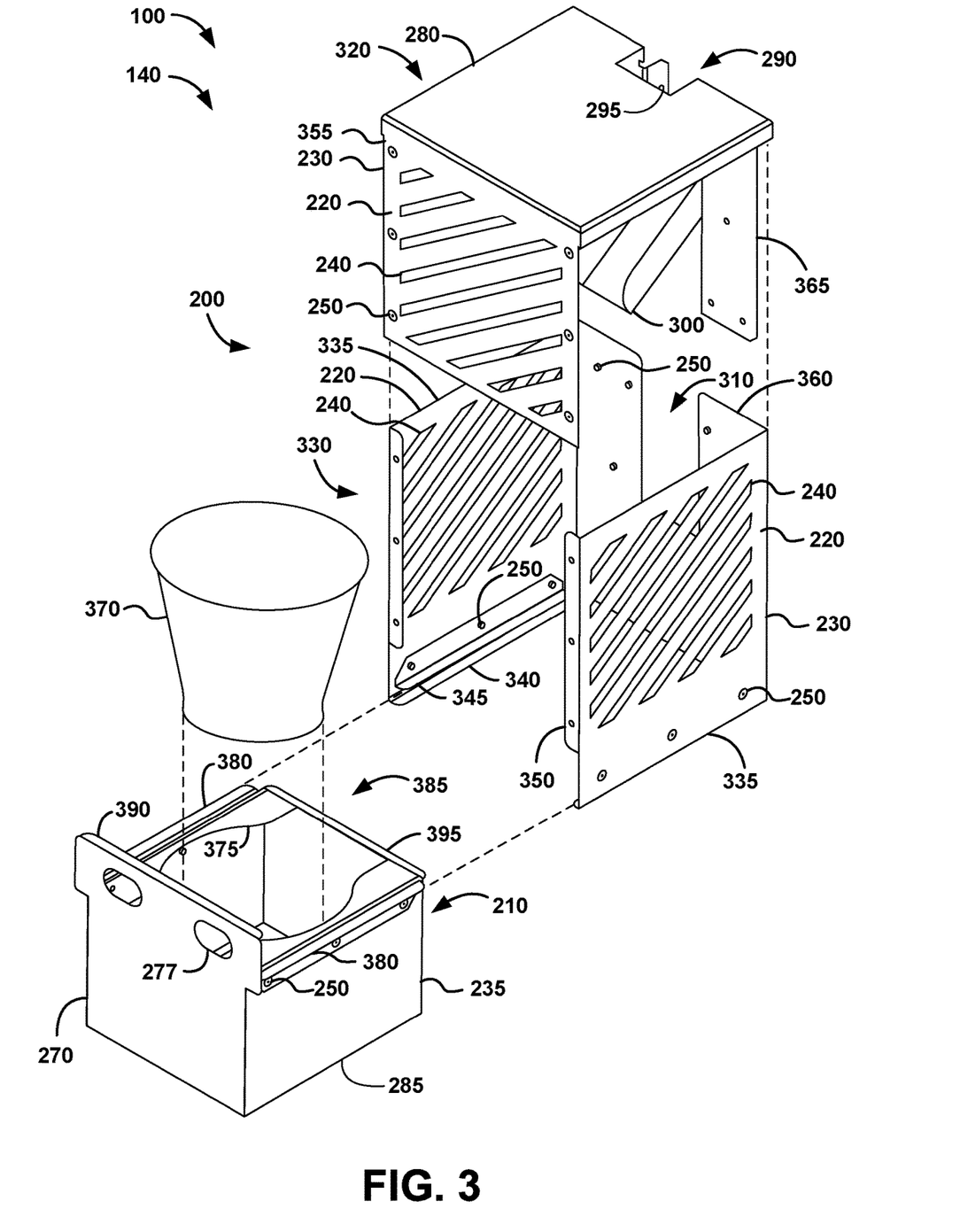
FIG. 3 shows an exploded view of the enclosure of the fluid containment system according to the preferred embodiment of FIG. 2.

Enclosure 140 preferably comprises an upper portion 200 and a lower portion 210, as shown. Upper portion 200 and lower portion 210 preferably separate, as best shown in FIG. 3, via a rail system. Upper portion 200 and lower portion 210 are each preferably assembled of constituent parts held together with fasteners 250, as shown. Upon reading the teachings of this specification, those with ordinary skill in the art will now appreciate that, under appropriate circumstances, considering such issues as future technologies, costs, consumer preferences, etc., other assembly means, such as, for example, casting, molding, 3-D printing, combinations thereof, etc., may suffice.

Fasteners 250 preferably comprise rivets, as shown, alternately preferably screws. Upon reading the teachings of this specification, those with ordinary skill in the art will now appreciate that, under appropriate circumstances, considering such issues as future technologies, manufacturing costs, durability, customer preferences, etc., other fasteners, such as, for example, bolts, adhesives, welds, slot joints, thumb screws, combinations of various fasteners, etc., may suffice.

Upper portion 200 preferably comprises a shell, as shown. The shell preferably comprises four walls 230 and a top 280, as shown. At least one wall 230 preferably comprises at least one ventilation panel 220, preferably at least two walls 230, preferably at least three walls 230, as shown. Ventilation panel 220 preferably allows air circulation through upper portion 200, as shown. The air circulation helps to cool the liquids in enclosure 140. Ventilation panel 220 preferably comprises at least one vent 240, preferably at least one opening in ventilation panel 220, preferably at least one slot opening, preferably at least one diagonal slot opening, as shown. Upon reading the teachings of this specification, those with ordinary skill in the art will now appreciate that, under appropriate circumstances, considering such issues as future technologies, manufacturing methods, costs, etc., other ventilation panels, such as, for example, circular openings, wavy opening, vertical openings, horizontal openings, splatter screens, perforations, angled perforations, etc., may suffice.

Upper portion 200 further comprises at least one drain receiver 290, as shown. Drain receiver 290 preferably comprises at least one opening, as shown. Opening comprises at least one top notch 295, as shown, and at least one back notch 310 (see FIG. 4). Drain receiver 290 preferably receives drain 130 of outdoor cooking device 110, as shown, allowing passage of the liquids into enclosure 140. Drain receiver 290 preferably is shaped and sized to at least receive drain 130, as shown, at a given angle, preferably at a plurality of angles, preferably a plurality of angles from horizontal to vertically downward. Top notch 295 preferably comprises a squared geometry, as shown, accommodating a drain geometry of drain 130 which is squared and extends at an angle such as to require passage, at least in part, through top 280.

Lower portion 210 preferably comprises a container, as shown. The container comprises a bottom 285 and four walls 235, as shown (at least embodying herein walls surrounding said at least one receptacle). The container is preferably watertight, as shown. Walls 235 and bottom 285 preferably are sealed at intersections together, as shown, preferably welded. Upon reading the teachings of this specification, those with ordinary skill in the art will now appreciate that, under appropriate circumstances, considering such issues as future technologies, manufacturing methods costs, etc., other watertight arrangements, such as, for example, coatings, liners, adhesives, etc., may suffice.

A front wall 270 of walls 235 of lower portion 210 preferably comprises at least one handle 275, preferably at least one finger-hole 277, preferably two finger-holes 277, as shown. Upon reading the teachings of this specification, those with ordinary skill in the art will now appreciate that, under appropriate circumstances, considering such issues as future technologies, costs, etc., other handles, such as, for example, knobs, grips, protrusions, indentations, rods, flanges, etc., may suffice.

Figure 4A:
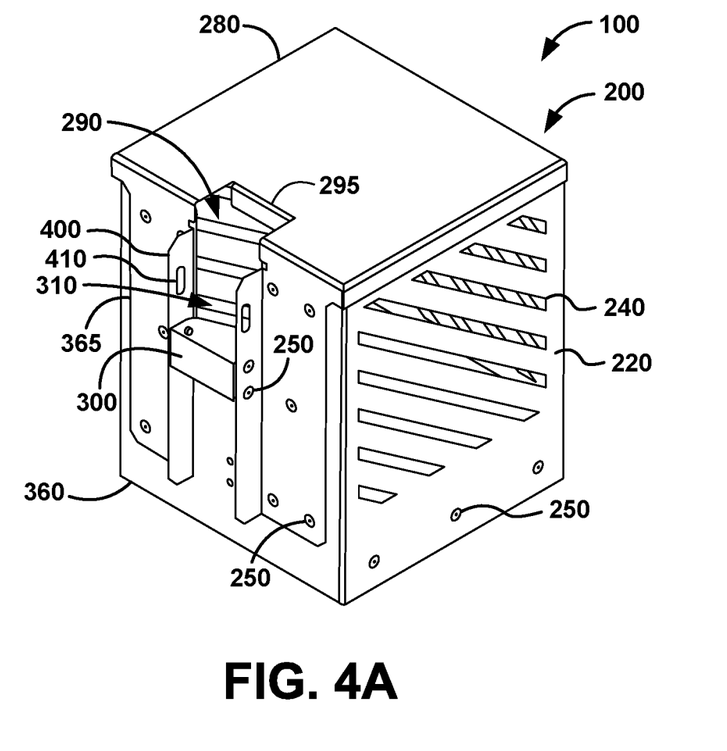
FIG. 4A shows a perspective view, illustrating an upper portion of the enclosure, according to the preferred embodiment of FIG. 2.
Figure 4B:
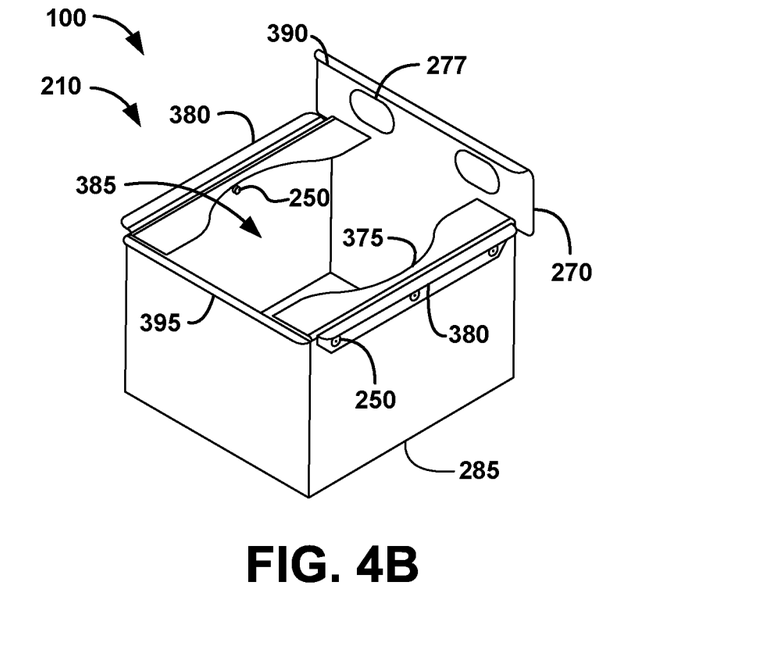
FIG. 4B shows a perspective view, illustrating a lower portion of the enclosure, according to the preferred embodiment of FIG. 2.

FIG. 3 shows an exploded view of the enclosure of the fluid containment system according to the preferred embodiment of FIG. 2. FIG. 4A shows a perspective view, illustrating an upper portion of the enclosure, according to the preferred embodiment of FIG. 2. FIG. 4B shows a perspective view, illustrating a lower portion of the enclosure, according to the preferred embodiment of FIG. 2.

The shell of upper portion 200 preferably further comprises two pieces assembled with fasteners 250, a first piece 330 and a second piece 320, as shown in FIG. 3. Upon reading the teachings of this specification, those with ordinary skill in the art will now appreciate that, under appropriate circumstances, considering such issues as manufacturing costs, future technologies, etc., other arrangements of construction, such as, for example, separate pieces for each side, single piece construction, etc., may suffice.

First piece 330 preferably comprises three walls 230, as shown in FIG. 3. Three walls 230 preferably comprise back wall 360 and two side walls 335, as shown in FIG. 3. Back wall 360 preferably comprises back notch 310, as shown in FIG. 3. Back notch 310 preferably comprises a rectangular notch from a top of the back wall 360 toward a center of back wall 360, preferably past the center of back wall 360, as shown in FIG. 3. Upon reading the teachings of this specification, those with ordinary skill in the art will now appreciate that, under appropriate circumstances, considering such issues as future technologies, costs, etc., other cutouts, such as, for example, circular punchouts, slot pass throughs, collars, etc., may suffice.

Second piece 320 preferably comprises top 280 and two walls 230, as shown in FIG. 3. Two walls 230 preferably comprise a back wall 365 and a front wall 355. Back wall 365 and back wall 360 preferably combine and overlap, as shown in FIGS. 3-4A. Back wall 365 preferably comprises two strips located to each side of back notch 310, as shown in FIG. 3. Upon reading the teachings of this specification, those with ordinary skill in the art will now appreciate that, under appropriate circumstances, considering such issues as future technologies, costs, mounting preferences, etc., other back wall structures, such as, for example, single layered walls, walls adjoining side walls, removably mounted walls, etc., may suffice.

Back wall 365 preferably further comprises two mount flanges 400, as shown in FIG. 4A. Mount flanges 400 preferably extend from back wall 365, as shown in FIG. 4A. Mount flanges 400 preferably are located on each side of back notch 310, as shown in FIG. 4A. Mount flanges 400 preferably comprise drain mounts 410, as shown in FIG. 4A, permitting enclosure 140 to mount on drain 130. Upon reading the teachings of this specification, those with ordinary skill in the art will now appreciate that, under appropriate circumstances, considering such issues as future technologies, costs, etc., other mounts, such as, for example, hanging mounts, collar mounts, flush mounts, mounts to cooking enclosure, bracket mounts, etc., may suffice.

Drain mounts 410 preferably comprise mounting holes, as shown in FIG. 4A. Upon reading the teachings of this specification, those with ordinary skill in the art will now appreciate that, under appropriate circumstances, considering such issues as future technologies, costs, etc., other mounts, such as, for example, plates, hooks, bayonet slots, rods, thumb screws, bolts, etc., may suffice.

Back notch 310 preferably accommodates a drainage channel 300, as shown in FIG. 3, and drain 130. Drainage channel 300 preferably mounts between the two strips of back wall 365, as shown in FIGS. 3-4A. Drainage channel 300 preferably mounts to mount flanges 400 using fasteners 250, as shown in FIG. 4A. Drainage channel 300 preferably passes through back notch 310, as shown in FIG. 4A. Drainage channel 300 directs the fluids from drain 130 to a center portion of upper portion 200 (see FIG. 5). Upon reading the teachings of this specification, those with ordinary skill in the art will now appreciate that, under appropriate circumstances, considering such issues as future technologies, costs, etc., other drainage channel mounts, such as, for example, bracket mounts, flush mounts, collar mounts, brace mounts, etc., may suffice.

First piece 330 preferably further comprises at least one rail slot on each side wall 335 of walls 230, as shown in FIG. 3. The at least one rail slot preferably forms from rail flange 340 and protrusion flange 345, as shown in FIG. 3. Rail flange 340 preferably extends perpendicular to a bottom edge of side wall 335, as shown in FIG. 3. Protrusion flange 345 preferably mounts to side wall 335, as shown in FIG. 3. Protrusion flange 345 preferably is located above rail flange 340 leaving the at least one rail slot, as shown in FIG. 3. Rail flange 345 preferably extends from about back wall 360 the width of side wall 335, as shown in FIG. 3. Protrusion flange 345 preferably is centered along length of rail flange 345, as shown in FIG. 3. Protrusion flange 345 preferably is shorter than rail flange 345, as shown in FIG. 3.

Side walls 335 of first piece 330 preferably comprise at least one front flange 350, as shown in FIG. 3. Front flange 350 preferably assembles to front wall 355 with fasteners 250, as shown in FIG. 3. Upon reading the teachings of this specification, those with ordinary skill in the art will now appreciate that, under appropriate circumstances, considering such issues as manufacturing costs, future technologies, etc., other arrangements of construction, such as, for example, separate pieces for each side, single piece construction, etc., may suffice.

Lower portion 210 preferably further comprises at least one rail 380, as shown in FIG. 3. Rail 380 preferably mounts to each side of lower portion 210 corresponding to the at least one rail slot of upper portion 200, as shown in FIG. 3. Rail 380 preferably slides into and out of the at least one rail slot, as shown in FIG. 3. Upon reading the teachings of this specification, those with ordinary skill in the art will now appreciate that, under appropriate circumstances, considering such issues as future technologies, costs, etc., other removable interconnections between upper portion and lower portion, such as, for example, bayonet locking, roller slides, screw mounting, door openings, etc., may suffice.

Lower portion 210 preferably further comprises at least one back flange 395, as shown in FIG. 3. Back flange 395 extends from a back side of lower portion 210, which is inserted first into upper portion 200, as shown in FIG. 3. Back flange 395 preferably stops lower portion 210 when slid on rail 380 to a fully inserted state (see FIG. 5). Upon reading the teachings of this specification, those with ordinary skill in the art will now appreciate that, under appropriate circumstances, considering such issues as future technologies, costs, etc., other stops, such as, for example, protrusions, screws, stops mounted on back wall, posts, notches, etc., may suffice.

Lower portion 210 preferably further comprises at least one receptacle support 375, as shown in FIG. 3. Receptacle support 375 preferably suspends a receptacle 370 in lower portion 210, as shown in FIG. 3 (at least embodying herein at least one receptacle support structured and arranged to support said at least one receptacle). Receptacle support 375 preferably comprises at least one flange, preferably at least one curved flange, as shown in FIG. 3. Receptacle support 375 preferably extends from a top of a side wall of walls 235 inward toward a center of lower portion 210, as shown in FIG. 3. Receptacle support 375 preferably creates an opening 385 at a top of lower portion 210, preferably a shaped opening, preferably shaped to at least partially match a side of receptacle 370, as shown in FIG. 3. Upon reading the teachings of this specification, those with ordinary skill in the art will now appreciate that, under appropriate circumstances, considering such issues as future technologies, costs, etc., other receptacle supports, such as, for example, wire frames, rings, braces, posts offset platforms, etc., may suffice.

Receptacle 370 preferably comprises a bucket, alternately preferably a bucket liner, as shown in FIG. 3. Upon reading the teachings of this specification, those with ordinary skill in the art will now appreciate that, under appropriate circumstances, considering such issues as future technologies, costs, etc., other receptacles, such as, for example, canisters, cups, absorbent materials, atomizers, binders, etc., may suffice.

Figure 5:
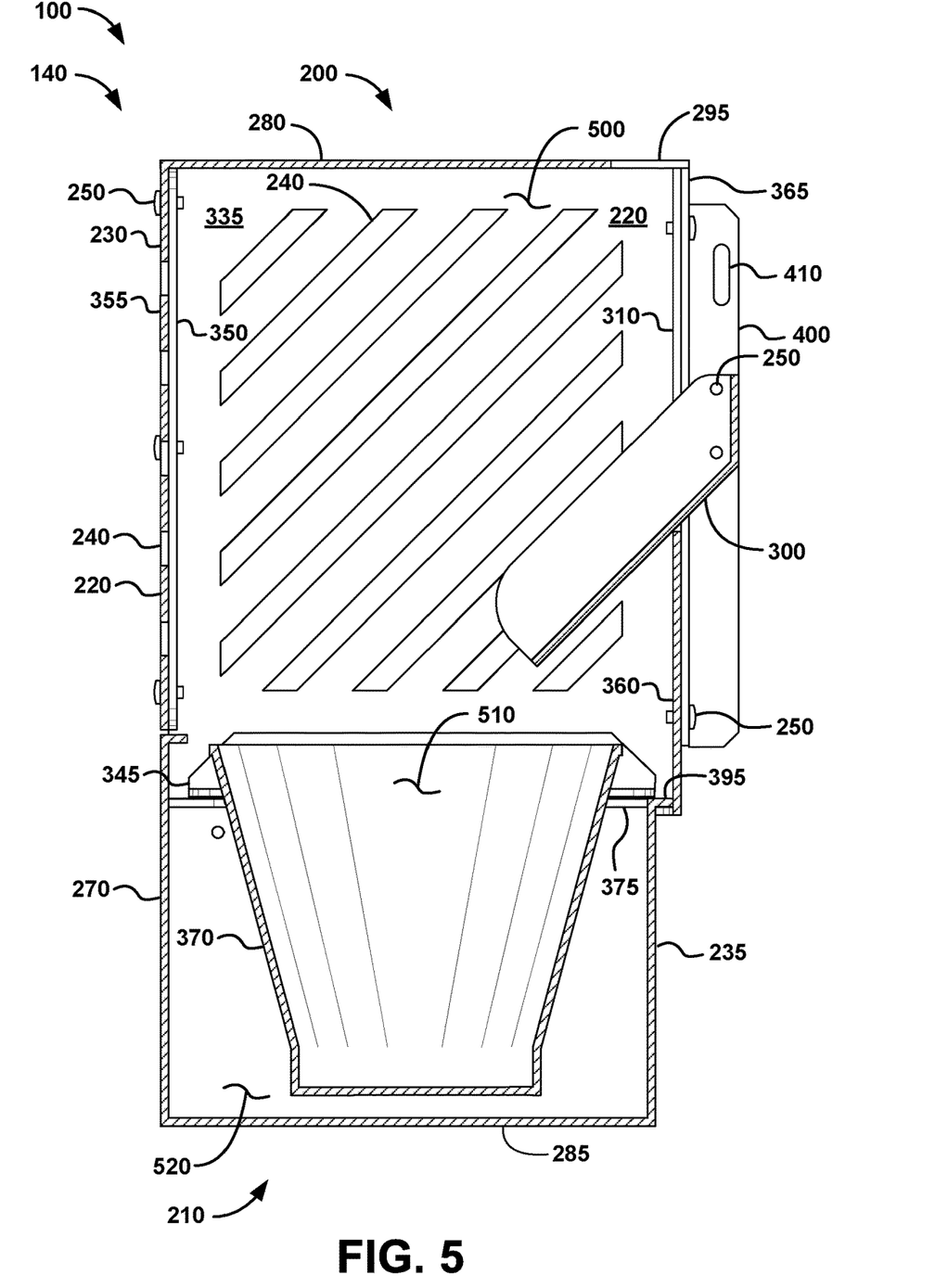
FIG. 5 shows the sectional view 5-5 of FIG. 2 according to the preferred embodiment of FIG. 1.

Receptacle 370 preferably is centered by receptacle support 375 inside lower portion 210 (see FIG. 5). When lower portion 210 is fully inserted into upper portion 200, drainage channel 300 preferably is over receptacle 370 (see FIG. 5). The fluids running down drainage channel 300 preferably drop off drainage channel 300 into receptacle 370.

Front wall 270 of lower portion 210 preferably extends above receptacle support 375, as shown in FIGS. 3 and 4B. Finger-holes 277 preferably are above receptacle support 375, as shown in FIGS. 3 and 4B. Front wall 270 preferably comprises at least one top flange 390, as shown in FIG. 3.

Top flange 390 preferably extends perpendicularly inward from a top of front wall 270, as shown in FIG. 3.

FIG. 5 shows the sectional view 5-5 of FIG. 2 according to the preferred embodiment of FIG. 1.

Upper portion 200 preferably comprises an upper cavity 500 inside the shell of upper portion 200, as shown. Lower portion 210 preferably comprises a lower cavity 520, as shown. Receptacle 370 (at least embodying herein at least one receptacle structured and arranged to receive and collect fluid draining from the outdoor cooking device generated by food cooking within a cooking enclosure of the outdoor cooking device) preferably comprises a receptacle cavity 510, as shown. The liquids from drain 130 enter enclosure 140 and run down drainage channel 300. The liquids run off drainage channel 300 and enter receptacle cavity 510. Heat from the liquids rises into upper cavity 500. Air flows through ventilation panel 220 carrying the heat from upper cavity 500 to an outdoor environment to which enclosure 140 is preferably directly exposed (at least herein embodying wherein said enclosure is directly exposed to the outdoor environment while mounted on the outdoor cooking device).

Lower cavity 520 creates an insulation between walls of receptacle 370 and walls 235 of lower portion, as shown (at least herein embodying wherein said enclosure comprises at least one insulation layer between said receptacle and said walls). The insulation preferably comprises an air gap in lower cavity 520, as shown. Therefore, heat is dissipated from the liquids preferably without heating enclosure 140 enough to cause burns through casual contact with enclosure 140. Upon reading the teachings of this specification, those with ordinary skill in the art will now appreciate that, under appropriate circumstances, considering such issues as future technologies, costs, etc., other insulations, such as, for example, water, foams, vacuum layers, ceramics, sand, etc., may suffice.

Figure 6:
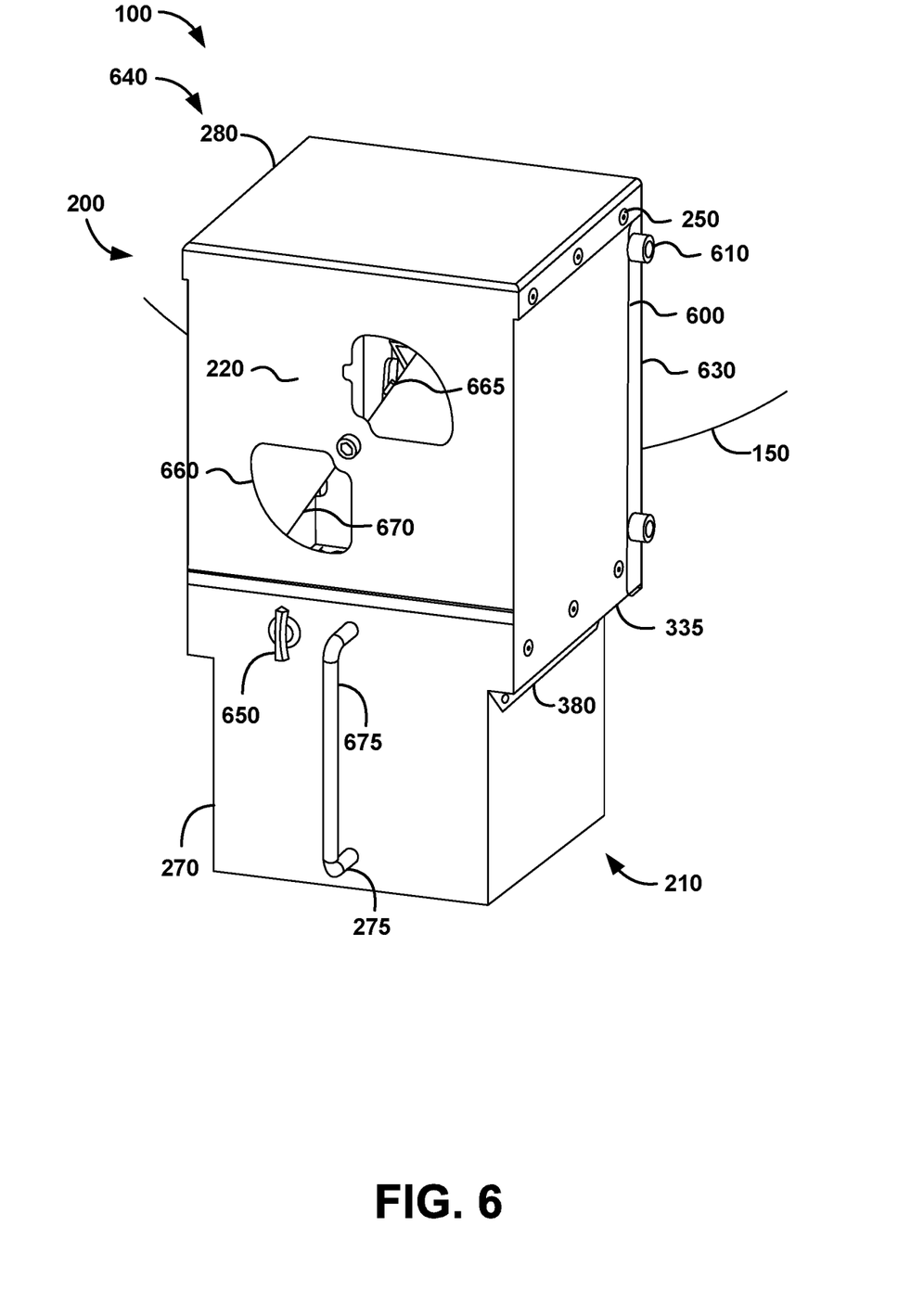
FIG. 6 shows a perspective view illustrating a fluid containment system according to an alternately preferred embodiment of the present invention.

FIG. 6 shows a perspective view illustrating a fluid containment system 100 according to an alternately preferred embodiment of the present invention.

Fluid containment system 100 alternately preferably comprises enclosure 640, as shown. Although many of the elements of enclosure 640 are repeated from enclosure 140, as shown in FIG. 6, enclosure 640 utilizes bar handle 675 instead of fingerholes 277 for handle 275 and back wall 630 instead of back wall 360 and back wall 365 on upper portion 200 and vent 660 instead of vent 240, as shown.

Lower portion 210 preferably comprises front wall 270, as shown. Front wall 270 preferably comprises handle 275, as shown. Handle 275 preferably comprises bar handle 675, as shown. Bar handle 675 preferably extends from front wall 270, as shown, and provides a bar to grasp with a hand. Upon reading the teachings of this specification, those with ordinary skill in the art will now appreciate that, under appropriate circumstances, considering such issues as future technologies, costs, etc., other handles, such as, for example, knobs, grips, protrusions, indentations, rods, flanges, etc., may suffice.

Further, front wall 270 preferably comprises at least one latching mechanism 650, as shown. Latching mechanism 650 preferably comprises a turning latch, as shown, comprising a cam inside enclosure 640. Latching mechanism 650 preferably latches lower portion 210 to upper portion 200, as shown, such that to access receptacle 270 latching mechanism must be unlatched prior to pulling handle 275 to disengage lower portion 210 from upper portion 200. Upon reading the teachings of this specification, those with ordinary skill in the art will now appreciate that, under appropriate circumstances, considering such issues as future technologies, costs, etc., other latching mechanisms, such as, for example, locks, bolts, chains, spring-loaded throws, etc., may suffice.

Figure 7:
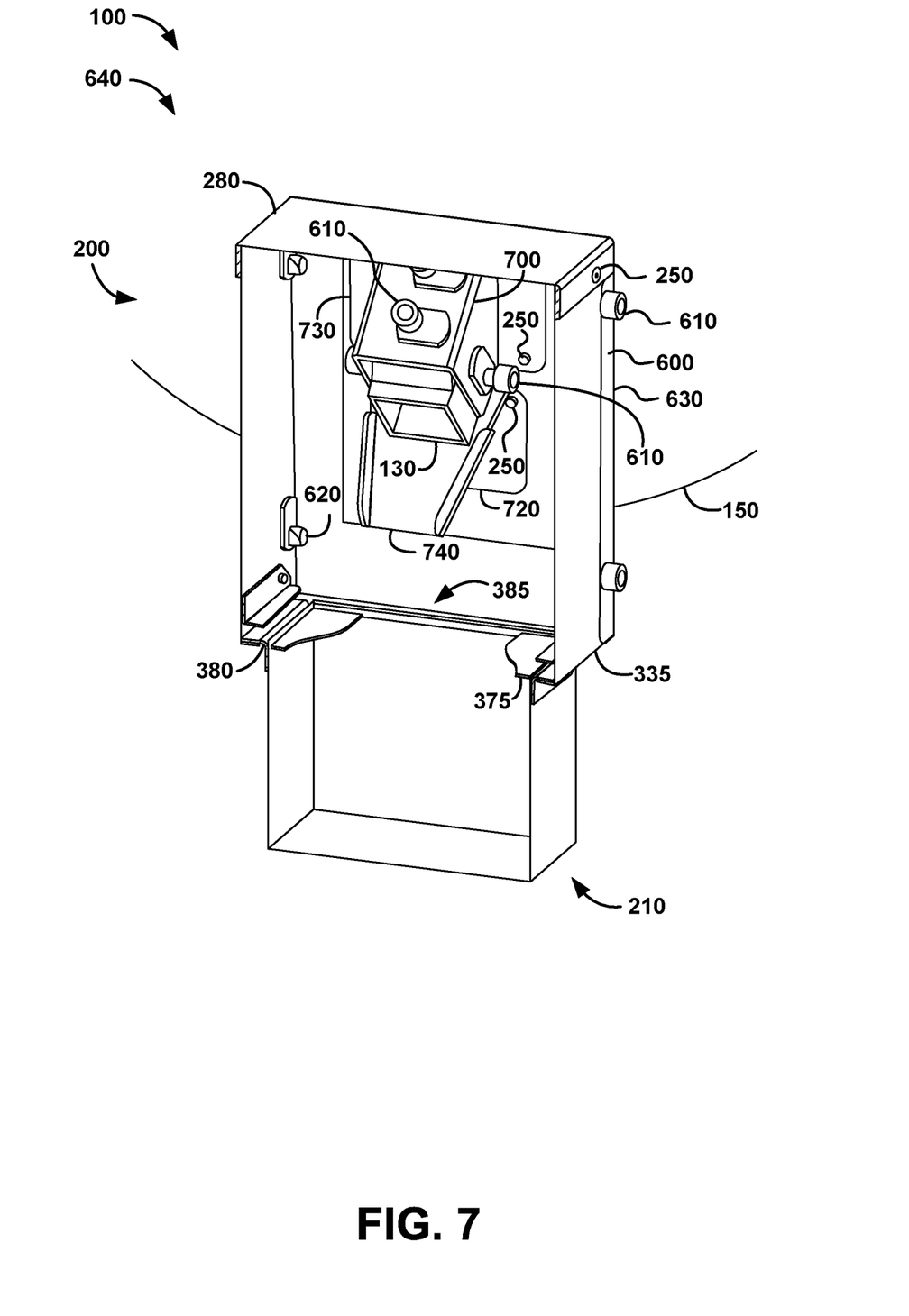
FIG. 7 shows a perspective cutaway view, illustrating an interior of the enclosure of the fluid containment system, according to the preferred embodiment of FIG. 6.

Back wall 630 of upper portion 200 preferably comprises at least one side flange 600, as shown. Side flange 600 preferably wraps around each side wall 335, as shown. Side flange 600 preferably assembles together with side wall 335 using release fasteners 610, as shown. Back wall 630 preferably mounts close to cooking enclosure 150, as shown. Back wall 630 preferably allows passage of drain 130 into enclosure 640, as shown in FIG. 7.

Release fasteners 610 preferably comprise thumb actuatable fasteners, preferably thumb screws, as shown. Upon reading the teachings of this specification, those with ordinary skill in the art will now appreciate that, under appropriate circumstances, considering such issues as future technologies, costs, etc., other releasable fasteners, such as, for example, wing nuts, cam latches, bayonet slots, etc., may suffice.

Ventilation panel 220 preferably comprises vent 660, as shown. Vent 660 preferably comprises an adjustable vent, as shown. Vent 660 preferably comprises at least one butterfly opening, as shown. Upon reading the teachings of this specification, those with ordinary skill in the art will now appreciate that, under appropriate circumstances, considering such issues as future technology, cost, etc., other vent openings, such as, for example, slots, holes, perforations, etc., may suffice.

Vent 660 preferably comprises at least one closure 670 to close off vent 660, as shown. Closure 670 preferably comprises at least one damper. Closure 670 preferably comprises tab 665, as shown. Closure 670 preferably rotates about a pivot adjusting the butterfly opening between fully open and fully closed, permitting the selection of the amount of ventilation to allow enclosure 640, as shown. Upon reading the teachings of this specification, those with ordinary skill in the art will now appreciate that, under appropriate circumstances, considering such issues as future technologies, cost, etc., other closures, such as, for example, sliding closures, door closures, flap closures, etc., may suffice.

In use, vent 660 provides for fire safety. When outdoor cooking device 110 is at higher temperatures, the air coming from the drain 130 may reach ignition temperatures for the fluids contained in receptacle 370. To prevent a fire condition, vent 660 preferably may be closed to minimize available oxygen within enclosure 640.

FIG. 7 shows a perspective cutaway view, illustrating an interior of the enclosure of the fluid containment system, according to the preferred embodiment of FIG. 6.

Although many of the elements of enclosure 640 are repeated from enclosure 140, as shown in FIG. 7, enclosure 640 utilizes collar mount 700 instead of mount flanges 400 to mount upper portion 200 to drain 130.

Back wall 630 preferably separates from the remainder of upper portion 200 allowing mounting of back wall 630 to drain 130, as shown (at least embodying herein at least one mount structured and arranged to mount said enclosure on the outdoor cooking device). Separation of back wall 630 is preferably achieved via release of release fasteners 610 from release nuts 620, as shown. Back wall 630 preferably further comprises at least one collar mount 700, as shown. Collar mount 700 preferably attaches to back wall 630 with fasteners 250, as shown. Collar mount 700 preferably surrounds drain 130, as shown, as a collar. Collar mount 700 preferably comprises release fasteners 610, as shown. Release fasteners 610 preferably tighten onto drain 130, mounting back wall 630 onto drain 130, as shown. Upon reading the teachings of this specification, those with ordinary skill in the art will now appreciate that, under appropriate circumstances, considering such issues as future technologies, cost, etc., other mounting mechanisms, such as, for example, clamps, annular rings, pins, hooks, etc., may suffice.

Drain 130 preferably comprises a tube, preferably a square tube, as shown. Upon reading the teachings of this specification, those with ordinary skill in the art will now appreciate that, under appropriate circumstances, considering such issues as future technologies, costs, etc., other drain shapes, such as, for example, circular, V-shaped, rectangular, etc., may suffice.

Back wall 630 preferably further comprises drainage channel 740, as shown. Drainage channel 740 preferably serves as an alternately preferably version of drainage channel 300, as shown. Drainage channel 740 preferably comprises a wedge shape, as shown. Drainage channel 740 preferably mounts with bracket 720 onto back wall 630 using fasteners 250, as shown. Upon reading the teachings of this specification, those with ordinary skill in the art will now appreciate that, under appropriate circumstances, considering such issues as future technologies, costs, etc., other drainage channels, such as, for example, tubes, semicircular channels, V-shaped channels, etc., may suffice.

It is understood that while enclosure 640 is presented as an alternate embodiment from enclosure 140, the differing elements presented as parts of enclosure 640 and enclosure 140, respectively, are capable of interchangeability between enclosure 640 and enclosure 140 with like elements.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system, relating to catching fluid drainage from an outdoor cooking device in an outdoor environment, comprising:
   a) at least one receptacle structured and arranged to receive and collect fluid draining from the outdoor cooking device generated by food cooking within a cooking enclosure of the outdoor cooking device; and
   b) an enclosure structured and arranged to enclose said at least one receptacle;
   c) wherein said enclosure comprises:
      an upper portion comprising a top and side walls;
      a lower portion comprising a bottom and side walls surrounding the at least one receptacle, the lower portion being separable from the upper portion;
         at least one receptacle support within the lower portion of the enclosure, the at least one receptacle support structured and arranged to support said at least one receptacle;
         at least one mount comprising a mounting flange extending outwardly from the upper portion of the enclosure, the mounting flange comprising a drain mount configured to mount the enclosure to a drain of the outdoor cooking device;
   d) wherein said enclosure comprises at least one insulation layer between said receptacle and the side walls; and
   e) wherein said enclosure is directly exposed to the outdoor environment while mounted to the drain of the outdoor cooking device.

2. The system according to claim 1 further comprising the outdoor cooking device.

3. The system according to claim 2 wherein said outdoor cooking device comprises a wood pellet grill.

4. The system according to claim 1 wherein at least one wall of said side walls comprises at least one thermal vent structured and arranged to vent heat from the fluid collected in said at least one receptacle out of said enclosure.

5. The system according to claim 4 wherein said at least one thermal vent comprises at least one damper structured and arranged to dampen air flow through said enclosure.

6. The system according to claim 1 wherein said lower portion and said upper portion comprise interlocking rails structured and arranged to enable said lower portion to slide with respect to said upper portion.

7. The system according to claim 1 wherein said lower portion comprises at least one latching mechanism structured and arranged to latch together said upper portion and said lower portion and stopping relative motion between said upper portion and said lower portion.

8. The system according to claim 1 wherein said upper portion comprises at least one fluid channel structured and arranged to redirect the fluid drainage from a fluid drainage outlet of the outdoor cooking equipment to said at least one receptacle.

9. The system according to claim 1 wherein said lower portion comprises at least one handle.

10. The system according to claim 1 wherein said lower portion comprises a watertight portion structured and arranged to collect fluid spills from said at least one receptacle.

11. The system according to claim 1 wherein said enclosure comprises a watertight portion structured and arranged to collect fluid spills from said at least one receptacle.

12. The system according to claim 1 wherein said at least one insulation layer comprises at least one air gap between said at least one receptacle and said walls.

13. The system according to claim 1 further comprising at least one fluid channel structured and arranged to redirect the fluid drainage from a fluid drainage outlet of the outdoor cooking equipment to said at least one receptacle.

14. The system according to claim 1 wherein said at least one receptacle support comprises at least one wall protrusion structured and arranged to protrude from at least one wall of said walls and engage said at least one receptacle.

15. The system according to claim 1 wherein said top further comprises at least one notch.

16. A system, relating to catching fluid drainage from an outdoor cooking device in an outdoor environment, comprising:
   a) the outdoor cooking device;
   b) at least one receptacle structured and arranged to receive and collect fluid draining from said outdoor cooking device generated by food cooking within a cooking enclosure of said outdoor cooking device; and
   c) an enclosure structured and arranged to enclose said at least one receptacle;
   d) wherein said enclosure comprises:
      an upper portion comprising a top and side walls;
      a lower portion comprising a bottom and side walls surrounding the at least one receptacle, the lower portion being separable from the upper portion;

at least one receptacle support within the lower portion of the enclosure, the at least one receptacle support structured and arranged to support said at least one receptacle;

at least one mount comprising a mounting flange extending outwardly from the upper portion of the enclosure, the mounting flange comprising a drain mount configured to mount the enclosure to a drain of the outdoor cooking device;

e) wherein said enclosure comprises at least one insulation layer between said receptacle and the side walls;

f) wherein at least one wall of said walls comprises at least one thermal vent structured and arranged to vent heat from the fluid collected in said at least one receptacle out of said enclosure;

g) wherein said at least one thermal vent comprises at least one damper structured and arranged to dampen air flow through said enclosure; and h) wherein said enclosure is directly exposed to the outdoor environment while mounted to the drain of said outdoor cooking device.

\* \* \* \* \*